United States Patent
Goto et al.

(10) Patent No.: US 7,855,902 B2
(45) Date of Patent: Dec. 21, 2010

(54) DC-DC CONVERTER WITH VOLTAGE DETECTION CIRCUIT FOR OVERCURRENT PROTECTION

(75) Inventors: Yukio Goto, Isesaki (JP); Madoka Nishikawa, Ora-Gun (JP)

(73) Assignees: Sanyo Electric Co., Ltd., Osaka (JP); Sanyo Semiconductor Co., Ltd., Gunma (JP)

(*) Notice: Subject to any disclaimer, the term of this patent is extended or adjusted under 35 U.S.C. 154(b) by 623 days.

(21) Appl. No.: 11/923,166

(22) Filed: Oct. 24, 2007

(65) Prior Publication Data

US 2008/0116864 A1    May 22, 2008

(30) Foreign Application Priority Data

Oct. 25, 2006    (JP) .............................. 2006-290230

(51) Int. Cl.
     *H02H 9/02*    (2006.01)
(52) U.S. Cl. ...................... 363/50; 323/285; 363/56.03
(58) Field of Classification Search .............. 363/56.03, 363/50, 56.04, 56.07, 56.1; 361/18, 93.1, 361/93.2, 93.7, 93.9, 94, 98

See application file for complete search history.

(56) References Cited

U.S. PATENT DOCUMENTS

| | | | |
|---|---|---|---|
| 5,018,041 A * | 5/1991 | Szepesi | ........................ 361/18 |
| 6,801,058 B1 * | 10/2004 | Jiandong | ...................... 327/20 |
| 7,342,391 B2 | 3/2008 | Tateno et al. | |
| 2005/0200398 A1 * | 9/2005 | Arai | ........................... 327/427 |

FOREIGN PATENT DOCUMENTS

| | | |
|---|---|---|
| CN | 1691480 | 11/2005 |
| JP | 2001-157442 | 6/2001 |
| JP | 2002-010627 | 1/2002 |

* cited by examiner

*Primary Examiner*—Harry Behm
(74) *Attorney, Agent, or Firm*—Morrison & Foerster LLP

(57) ABSTRACT

In a DC-DC converter of this invention, a voltage detection circuit is connected in parallel with an output switching device, and the voltage detection circuit is put into operation a predetermined time after the output switching device is turned on. In addition, a detection switching device, which constitutes the voltage detection circuit, is designed to have a higher ON resistance than an ON resistance of the output switching device.

6 Claims, 4 Drawing Sheets

DC-DC CONVERTER WITH VOLTAGE DETECTION CIRCUIT FOR OVERCURRENT PROTECTION

CROSS-REFERENCE OF THE INVENTION

This application claims priority from Japanese Patent Application No. 2006-290230, the content of which is incorporated herein by reference in its entirety.

BACKGROUND OF THE INVENTION

1. Field of the Invention

This invention relates to a DC-DC converter, specifically to a DC-DC converter provided with an overcurrent protection function.

2. Description of the Related Art

FIG. 3 is a circuit diagram showing a step-down DC-DC converter according to a conventional art, which converts an input voltage Vin to an output voltage Vout that is lower than the input voltage Vin. That is, when the DC input voltage Vin is inputted from an input power supply, the input voltage Vin is stepped down by turning on/off of an output switching device 101 made of a MOS transistor and smoothed into the DC output voltage Vout by a smoothing circuit composed of an inductor 102, a diode 103 and a capacitor 104.

To describe more concretely, when a signal S1 is applied from a controller circuit 109 to a gate of the output switching device 101, the output switching device 101 is turned on and an output current I101 flows through the output switching device 101. And the output current I101 flows through an output resistor 105 to raise the output voltage Vout linearly, while accumulating magnetic energy in the inductor 102.

When the signal S1 is not applied to the gate of the output switching device 101, although the output switching device 101 is turned off and the output current I101 does not flow, the magnetic energy stored in the inductor 102 is released as an inductor current I102, which is provided to the output resistor 105 flowing through a diode 103, while decreasing linearly to reduce the output voltage Vout.

This operation is repeated and a level of the output voltage Vout takes a triangular waveform that alternates between the increase and the decrease. In practice, the output voltage Vout is outputted as an approximately constant DC voltage, since a difference between a maximum value and a minimum value of the triangular waveform of the voltage level is negligibly small. The maximum value and the minimum value of the voltage level are controlled by the input voltage Vin and a duty ratio of the signal S1. Thus, the output voltage Vout is variably controlled by switching operation of the output switching device 101.

Further description related to the technologies mentioned above can be found in Japanese Patent Application Publication No. 2001-157442, for example.

The DC-DC converter generally requires an overcurrent protection function so that the output switching device 101 is not destroyed because of an excessive current caused by some reason while the output switching device 101 is turned on.

Regarding the above, a detection resistor 108 is interposed between the inductor 102 and the output resistor 105 and the overcurrent is detected based on an electric potential difference between both ends of the detection resistor 108 in the DC-DC converter according to the conventional art. When the overcurrent is detected, the control circuit 109 is instructed not to output the signal S1 so that the overcurrent does not flow through the output switching device 101.

However, because the detection resistor 108 is placed in a main current path, the whole output current I101 flows through the detection resistor to cause a large power loss. As a result, there arises a need for a countermeasure of some kind against the heat generation, which causes a problem in a size and cost of the DC-DC converter.

SUMMARY OF THE INVENTION

Considering the above, this invention offers a DC-DC converter that converts an inputted DC voltage to a different voltage by turning on/off of an output switching device, including a voltage detection circuit connected in parallel with the output switching device, wherein the voltage detection circuit is put into operation after the switching device is turned on and detects a voltage corresponding to an electric potential difference between both ends of the output switching device.

This invention also offers the DC-DC converter including an inductor, a diode and a capacitor disposed in an output-side of the output switching device.

This invention also offers the DC-DC converter including the voltage detection circuit provided with a detection resistor through which a current corresponding to the electric potential difference between both ends of the output switching device flows, wherein the electric potential difference between both ends of the output switching device is detected based on the current.

This invention also offers the DC-DC converter including the voltage detection circuit further provided with a detection switching device that is connected with the detection resistor and the current flows through the detection resistor when the detection switching device is turned on.

This invention also offers the DC-DC converter wherein the output switching device and the detection switching device are made of MOS transistors, each of which is turned on or off in response to a voltage applied to each of their gates, respectively.

This invention also offers the DC-DC converter, wherein an ON resistance of the output switching device is lower than an ON resistance of the detection switching device.

This invention also offers the DC-DC converter wherein the detection switching device is controlled to turn on while the output switching device is operating in a linear region.

This invention also offers the DC-DC converter wherein the output switching device is a vertical MOS transistor.

DETAILED DESCRIPTION OF THE INVENTION

Figure 1:
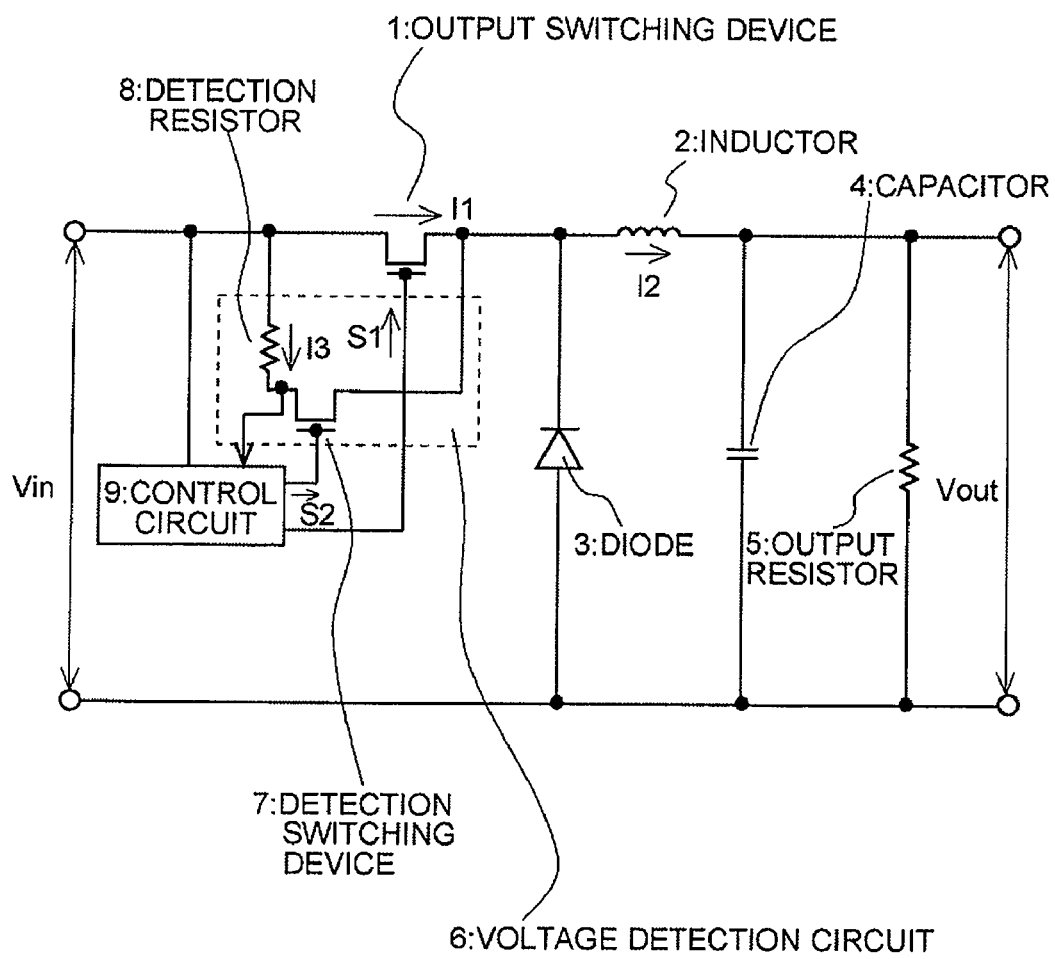
FIG. 1 is a circuit diagram showing a DC-DC converter according to an embodiment of this invention.

A DC-DC converter according to an embodiment of this invention will be explained hereafter in detail, referring to the drawings.

FIG. 1 is a circuit diagram showing a step-down DC-DC converter according to the embodiment of this invention, which converts an input voltage Vin to an output voltage Vout that is lower than the input voltage Vin. That is, when the DC input voltage Vin is inputted from an input power supply, the input voltage Vin is stepped down by turning on/off of an output switching device 1 made of a MOS transistor and smoothed into the DC output voltage Vout by a smoothing circuit composed of an inductor 2, a diode 3 and a capacitor 4.

To describe more concretely, when a signal S1 is applied from a controller circuit 9 to a gate of the output switching device 1, the output switching device 1 is turned on and an output current I1 flows through the output switching device 1. And the output current I1 flows through an output resistor 5 to raise the output voltage Vout linearly, while accumulating magnetic energy in the inductor 2.

When the signal S1 is not applied to the gate of the output switching device 1, although the output switching device 1 is turned off and the output current I1 does not flow, the magnetic energy stored in the inductor 2 is released as an inductor current I2, which is provided to the output resistor 5 flowing through a diode 3, while decreasing linearly to reduce the output voltage Vout.

This operation is repeated and a level of the output voltage Vout takes a triangular waveform that alternates between the increase and the decrease. In practice, the output voltage Vout is outputted as an approximately constant DC voltage, since a difference between a maximum value and a minimum value of the triangular waveform of the voltage level is negligibly small. The maximum value and the minimum value of the voltage level are controlled by the input voltage Vin and a duty ratio of the signal S1. Thus, the output voltage Vout is variably controlled by switching operation of the output switching device 1.

A voltage detection circuit 6 is connected in parallel with the output switching device 1 in the DC-DC converter according to the embodiment of this invention. The voltage detection circuit 6 detects an amount of the output current I1 by measuring an electric potential difference between both ends of the output switching device 1 while the signal S1 is outputted from the control circuit 9 and the output switching device 1 is turned on. At that time, if the measured electric potential difference is larger than a predetermined value, the voltage detection circuit judges that an overcurrent flows through the output switching device 1 and instructs the control circuit 9 to halt providing the signal S1 to prevent destruction of the output switching device 1.

To describe more concretely, the voltage detection circuit 6 is composed of a detection switching device 7 made of a MOS transistor and a detection resistor 8. When a signal S2 is outputted from the control circuit 9 to a gate of the detection switching device 7, the detection switching device 7 is turned on and a mirror current I3 flows through the output resistor 8 based on the output current I1 that flows through the output switching device 1. The electric potential difference between both ends of the detection resistor 8 based on the mirror current I3 is measured. When the electric potential difference exceeds the predetermined value, it is judged that the overcurrent flows through the output switching device 1.

The detection switching device 7 which has a higher ON resistance than that of the output switching device 1 is selected. As a result, the countermeasure against the heat generation is not required since an amount of the mirror current I3 is smaller than the amount of the output current I1 and a power loss in the detection resistor 8 is suppressed.

When the output switching device 1 is turned off immediately after power-on, there is caused approximately the same amount of electric potential difference as the input voltage Vin between both ends of the output switching device 1, although the output current I1 does not flow through the output switching device 1 because of its non-conductive status. Therefore, if the detection switching device 7 is turned on while the output switching device 1 is turned off, there is caused a large electric potential difference based on the input voltage Vin between both ends of the detection resistor 8, although the output current I1 does not flow through the output switching device 1. As a result, the voltage detection circuit 6 misjudges that the overcurrent flows through the output switching device 1 and instructs the control circuit 9 to keep from providing the output switching device 1 with the signal S1.

Figure 2:
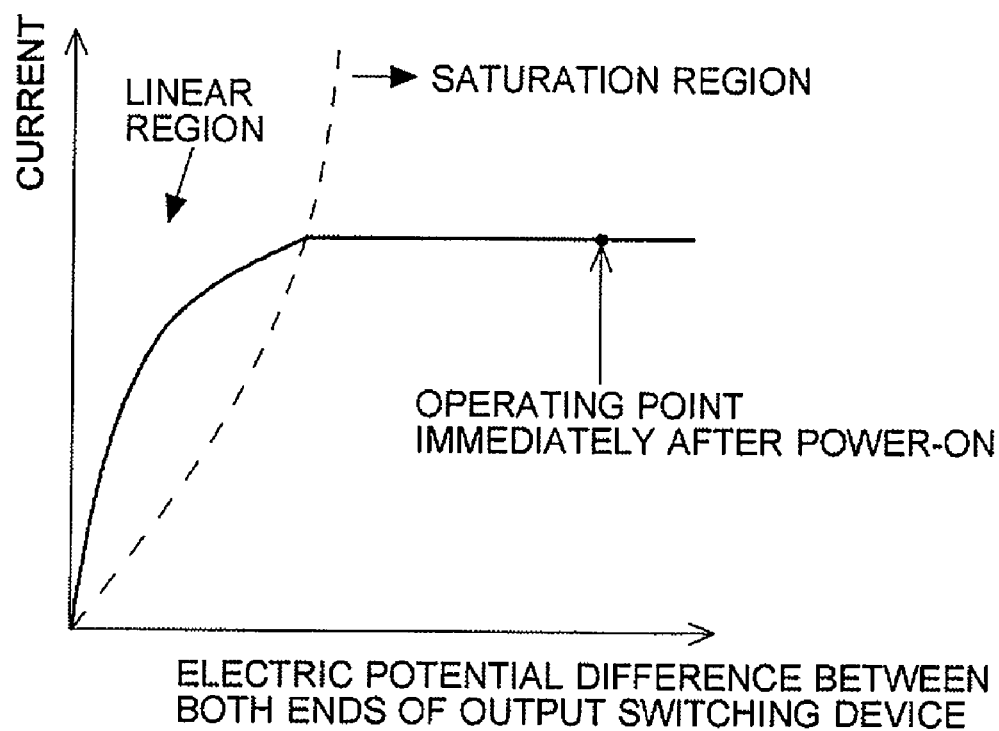
FIG. 2 shows a correlation between a current and an electric potential difference across an output switching device in the DC-DC converter according to the embodiment of this invention.
Figure 3:
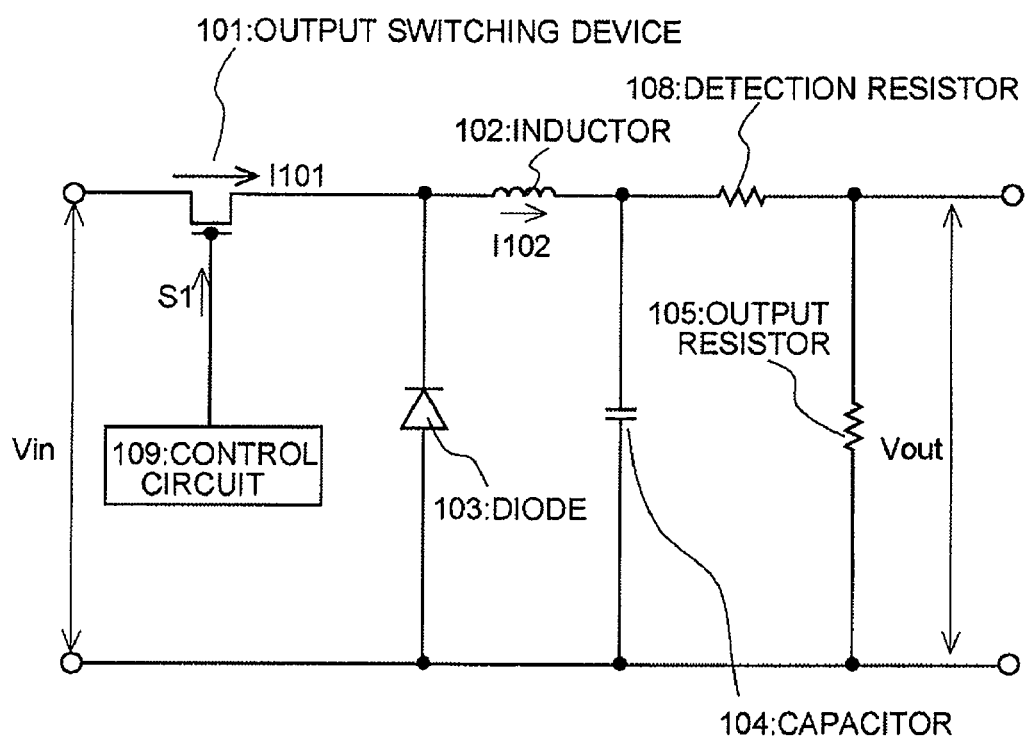
FIG. 3 is a circuit diagram showing a DC-DC converter according to a conventional art.

Also, immediately after the output switching device 1 is turned on, an operating point of the output switching device 1 is in a saturation region, as shown in FIG. 2. Therefore, between both ends of the output switching device 1, there is caused a large electric potential difference not based on the amount of the output current I1. As a result, in this case also, the voltage detection circuit 6 misjudges that the overcurrent flows through the output switching device 1 and instructs the control circuit 9 to keep from providing the output switching device 1 with the signal S1.

In short, the malfunction of the detection circuit 6 could occur both after the output switching device 1 is energized and after the energized output switching device 1 is turned on during the DC-DC conversion.

In the DC-DC converter according to the embodiment of this invention, therefore, the control circuit 9 is configured to output the signal S2 behind the signal S1 with some delay after the power-on and/or after the turning-on of the output switching device 1. To be more specific, the control circuit 9 outputs the signal S2 behind the signal S1 with a delay of at least a time required for the operation point of the output switching device 1 to reach the linear region. As a result, only the mirror current I3 corresponding to the current that flows through the output switching device 1 flows through the detection resistor 8, thereby eliminating the misdetection.

With the DC-DC converter according to the embodiment of this invention, the mirror current I3 that corresponds to the output current I1 flowing through the output switching device 1 is measured, and the destruction of the output switching device 1 can be prevented by monitoring the amount of the output current I1.

The mirror current I3 can be reduced since the ON resistance of the detection switching device 7 is larger than the ON resistance of the output switching device 1. Therefore, the heat generation in the detection resistor 8 can be suppressed.

The control circuit 9 is configured so that it can send the signal to the detection switching device 7, which is different from the signal to the output switching device 1. The detection switching device 7 is controlled to turn on at a predetermined time after the output switching device 1 is turned on. As a result, the misdetection of the current flowing through the output switching device 1 can be prevented.

The embodiment disclosed above only shows an example and should not be regarded as a restriction on a scope of the invention. The embodiment may be modified within the scope of the invention.

For example, although the output switching device 1 is made of the MOS transistor in the embodiment described above, the output switching device 1 may be made of a bipolar transistor or the like. Also, although the output switching device 1 is controlled to turn on when the signal S1 is applied, this invention is not limited to the above and the output switching device 1 may be controlled to turn off when the signal S1 is applied. Also, the output switching device 1, the control circuit 9, the detection switching device 7 and the diode 3 may be formed in a single chip, or each of them may be formed in a separate chip and encapsulated together in a single package.

It is difficult to obtain the best characteristics through the selection of the output switching device 1 when the output switching device 1, the control circuit 9, the detection switching device 7 and the diode 3 are formed in a single chip. That is, when the output switching device 1 is a bipolar transistor, it is not suitable for high frequency operation such as operation at 300 kHz, for example, because of its slow switching speed. Also, when the output switching device 1 is a P-channel MOS transistor, it is not suitable for large current operation because of its high ON resistance. Also, when the output switching device 1 is an N-channel MOS transistor, the chip area becomes large because the control circuit becomes complicated.

Therefore, a discrete device is used as the output switching device 1. To be more specific, a P-channel type vertical MOS transistor is best suitable. That is, when the P-channel type vertical MOS transistor is used as the output switching device 1, reducing the ON resistance is made possible as well as operating at the high frequency. In this case, it is preferable that the output switching device 1 and the detection switching device 7 are integrated into a single chip.

Figure 4:
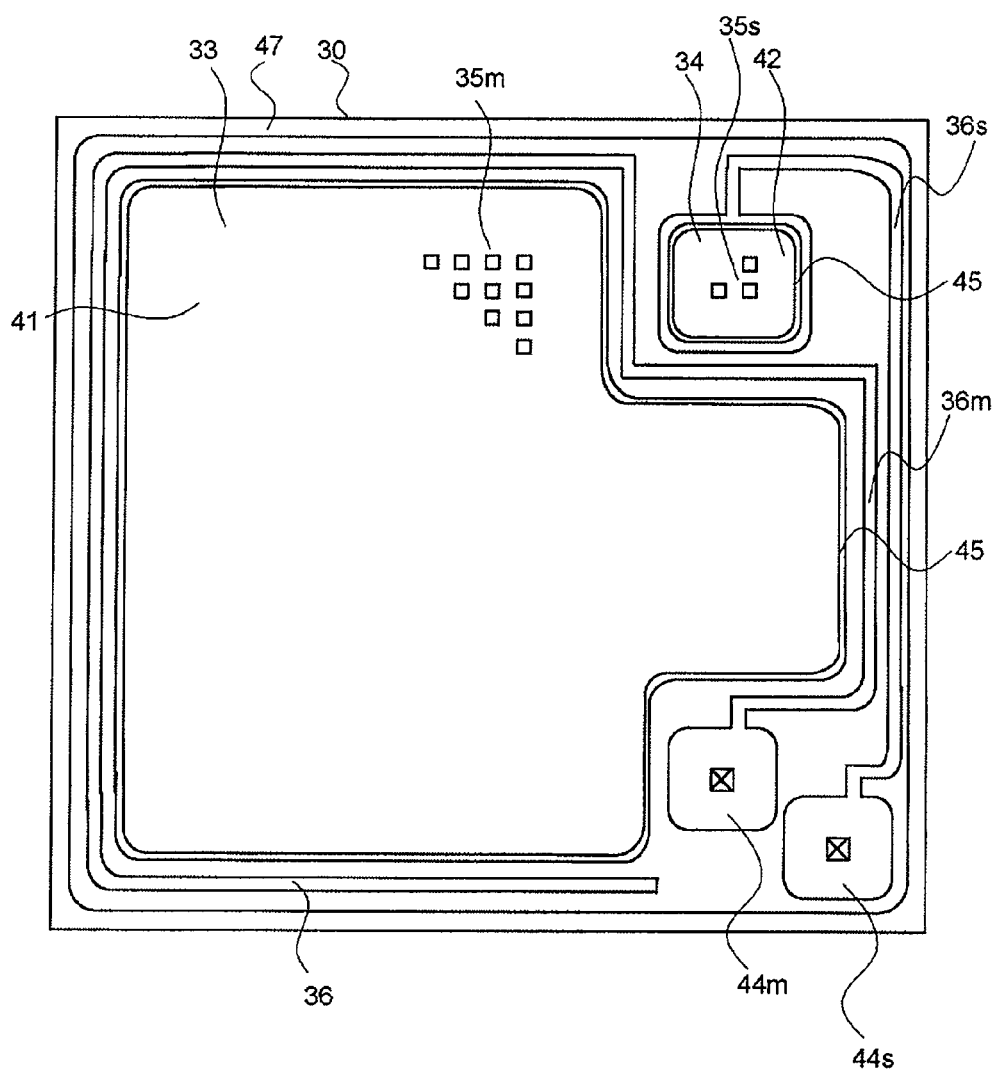
FIG. 4 shows an example of the output switching device and an detection switching device according to the embodiment of this invention.

FIG. 4 is a plan view showing a vertical MOS transistor single chip that integrates the output switching device 1 and the detection switching device 7. The vertical MOS transistor single chip is composed of a main operation portion 41 that is made of a plurality of MOS transistors 35m and serves as the output switching device 1 and a sensing portion 42 that is made of a plurality of MOS transistors 35s and serves as the detection switching device 7. A channel region 33 of the main operation portion 41 is separated from a channel region 34 of the sensing portion 42 by a predetermined spacing. To describe concretely, a semiconductor substrate 30 is formed of an $N^+$-type silicon semiconductor substrate and an $N^-$-type semiconductor layer stacked thereupon, for example, and serves as a drain region. The P-type channel regions 33 and 34 are formed in a surface of the $N^-$-type semiconductor layer. Trenches are formed in each of the channel regions 33 and 34, covered with an insulation film and filled with gate electrodes to form the MOS transistors 35m and 35s, which are disposed in a grid form. When necessary, a guard ring 45 is formed by diffusing $P^+$-type impurities and disposed in the surface of the $N^-$-type semiconductor layer on a periphery of each of the channel regions 33 and 34. In addition, a shield metal 47 is provided on an outermost periphery of the chip.

In this embodiment, gate electrode pads 44m and 44s are provided on a surface at a corner of the chip (the semiconductor substrate 30), so that the MOS transistors 35m in the main operation portion 41 and the MOS transistors 35s in the sensing portion 42 are controlled separately. The gate electrodes that control the main operation portion 41 are connected with the gate electrode pad 44m through a gate electrode connection 36m that is made of polysilicon or the like. Similarly, the gate electrodes that control the sensing portion 42 are connected with the gate electrode pad 44s through a gate electrode connection 36s. With a structure described above, it is made possible that the detection switching device 7 is put into operation after the output switching device 1 is turned on by applying the signal on the gate electrode pad 44s after applying the signal on the gate electrode pad 44m.

Each of the ON resistances of the output switching device 1 and the detection switching device 7 is proportional to the number of each of the MOS transistors (cells) 35m and 35s, respectively, in the vertical MOS transistor single chip. The number of cells of the MOS transistors 35m is larger than the number of cells of the MOS transistors 35s, since the main operation portion 41 is formed to take a larger area than an area taken by the sensing portion 42 in this embodiment. With this, it is made possible that the ON resistance of the output switching device 1 is lower than that of the detection switching device 7.

With the DC-DC converter according to the embodiment of this invention, the misdetection of the electric potential difference between both ends of the output switching device is prevented because the electric potential difference is detected after the output switching device is turned on. In this case, the misdetection is surely prevented particularly when the electric potential difference between both ends of the output switching device 1 is detected after the output switching device 1 is put into operation in the linear region.

Also, by forming the detection switching device 7 so that its ON resistance is larger than the ON resistance of the output switching device 1, the current flowing through the detection resistor 8, which constitutes the voltage detection circuit 6, is reduced and the power loss is suppressed.

Also, forming the output switching device 1 from the vertical MOS transistor makes it possible to reduce the ON resistance as well as operating at the high frequency.

What is claimed is:

1. A DC-DC converter comprising:
   an input terminal receiving a DC input voltage;
   an output terminal outputting a DC output voltage;
   an output switching device connected between the input and output terminals;
   a voltage detection circuit connected between both ends of the output switching device and detecting a voltage corresponding to an electric potential difference between both ends of the output switching device; and
   a control circuit turning on the voltage detection circuit at a predetermined time after the output switching device is turned on,
   wherein the voltage detection circuit comprises a detection resistor through which a current corresponding to the electric potential difference flows and a detection switching device connected to the detection resistor, the voltage detection circuit being configured to detect the voltage corresponding to the electric potential difference based on the current, and the detection switching device being configured to be turned on so as to allow the current to flow through the detection resistor, and
   wherein the control circuit controls the detection switching device so that the detection switching device is turned on when the output switching device is operating in a non-saturating manner.

2. The DC-DC converter of claim 1, further comprising an inductor, a diode and a capacitor that are connected between the output switching device and the output terminal.

3. The DC-DC converter of claim 1, wherein the output switching device comprises a first MOS transistor and the detection switching device comprises a second MOS transistor, and the control circuit supplies different signals to gates of the first and second MOS transistors.

4. The DC-DC converter of claim 3, wherein an ON resistance of the first MOS transistor is lower than an ON resistance of the second MOS transistor.

5. The DC-DC converter of claim 1, wherein the output switching device comprises a vertical MOS transistor.

6. The DC-DC converter of claim 1, wherein the output switching device comprises a plurality of first vertical MOS transistors comprising a semiconductor layer of a first conductivity type, a first channel region of a second conductivity formed in a surface of the semiconductor layer, and a first gate electrode pad disposed on the semiconductor layer and electrically connected to gate electrodes of the first vertical MOS transistors, the detection switching device comprises a plurality of second vertical MOS transistors comprising a second channel region of the second conductivity formed in the surface of the semiconductor layer, and a second gate electrode pad disposed on the semiconductor layer and electrically connected to gate electrodes of the second vertical MOS transistors, and the first channel region is larger than the second channel region.

* * * * *